United States Patent Office 3,436,968
Patented Apr. 8, 1969

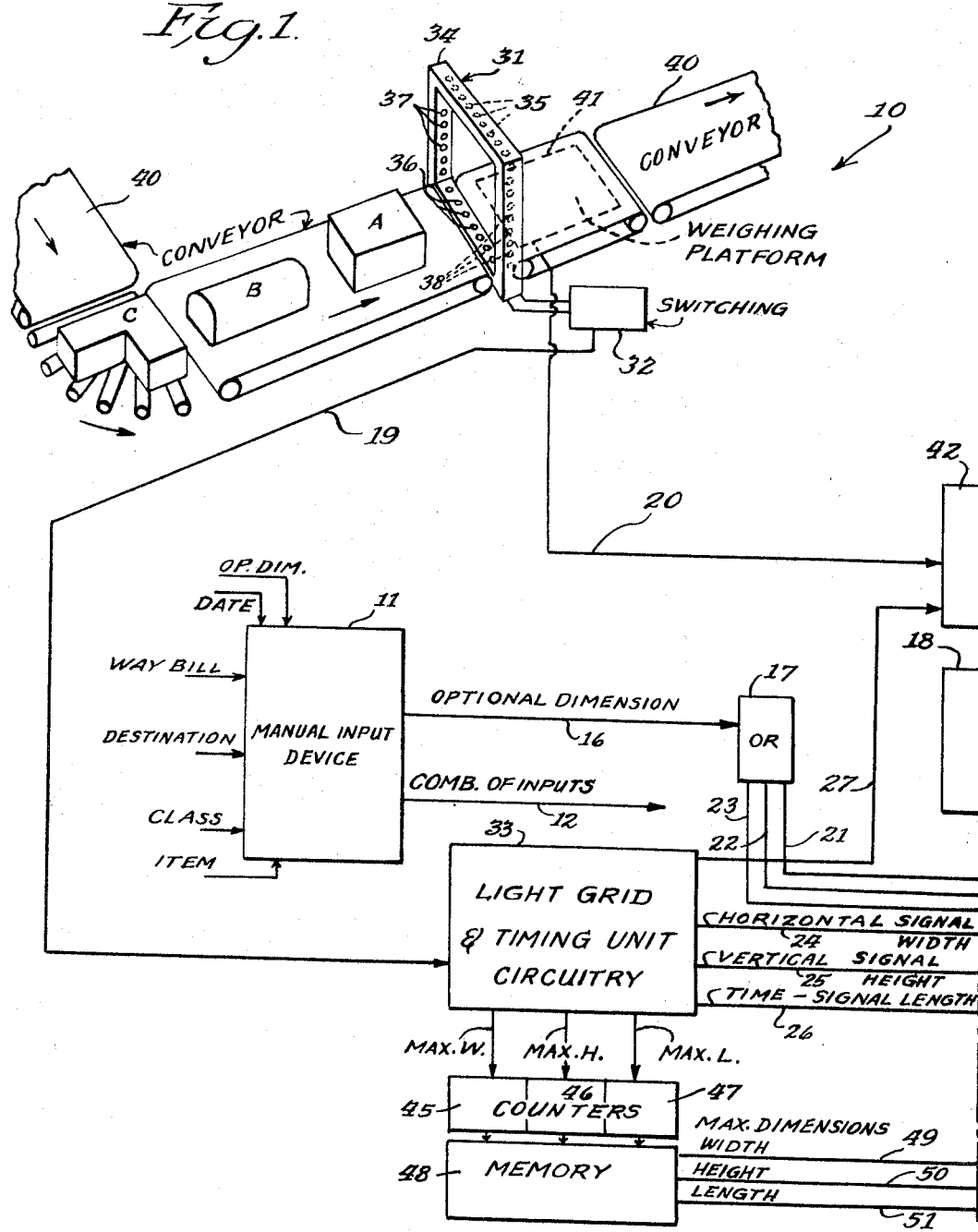

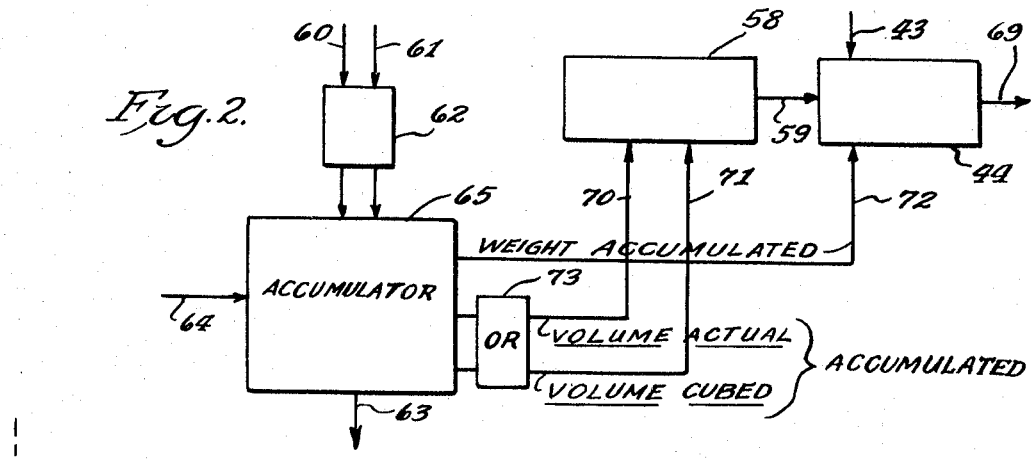
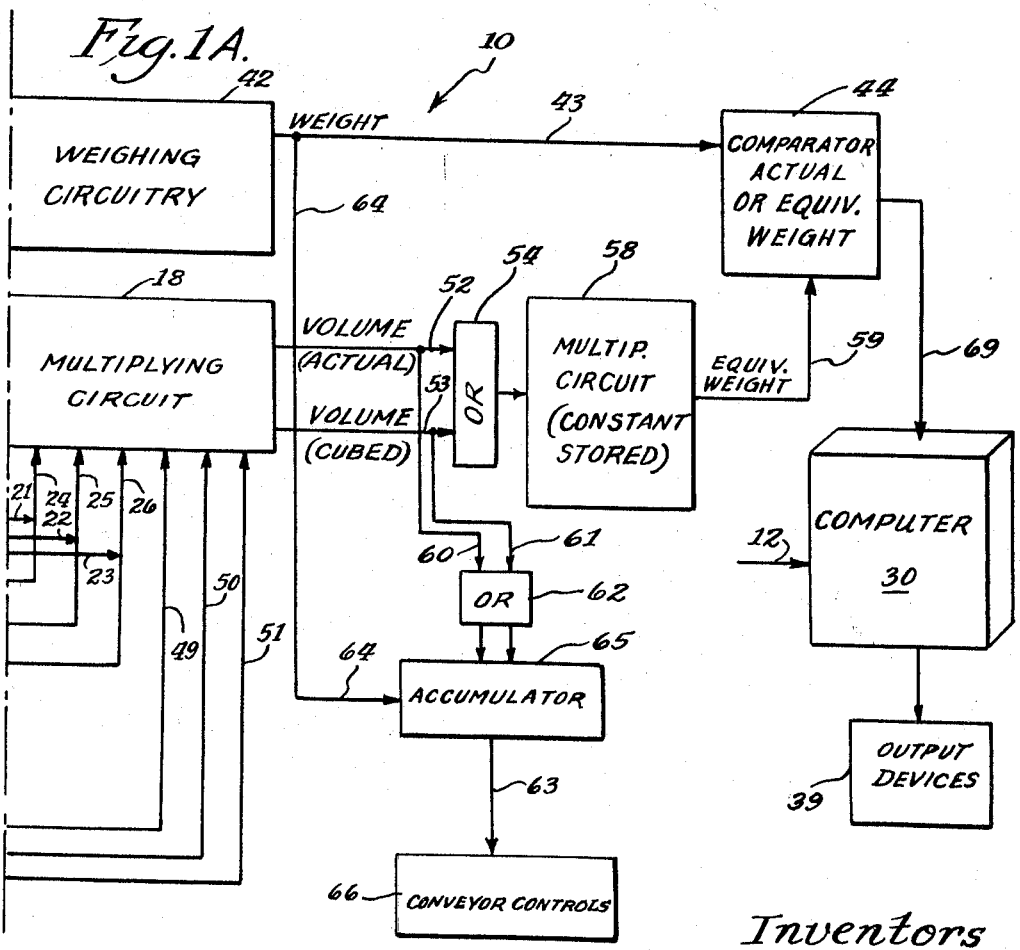

3,436,968
PROCESSING CONTROL SYSTEM
Peter I. Unger and Edward D. Bright, New York, N.Y., assignors to Fairbanks Morse Inc., New York, N.Y., a corporation of Delaware
Filed Feb. 11, 1965, Ser. No. 431,930
Int. Cl. G01n *9/02;* G01g *1/12, 23/26*
U.S. Cl. 73—433
3 Claims

ABSTRACT OF THE DISCLOSURE

A system and method for obtaining the volume of an article moving along a selected path is disclosed. The system includes an apparatus providing a plurality of beams of energy directed to form essentially a matrix plane, and sensing means selectively responsive to the beams. The interruption of selected ones of the beams by an article moving in said matrix plane provides an indication of the height and width dimensions of an article. Apparatus provided for sensing that an article is in the field of said plane provides an indication of the length of the article.

The height, width and length measurements are combined by data processing means to determine the volume of the article.

This invention relates to a processing control system and more particularly to such a control system for determining the volume and the weight of selected articles and providing output information in accordance therewith for control purposes.

It is a principal object of the present invention to provide an improved means of obtaining the height, width and length measurements of an article and to combine these measurements to obtain and determine the volume of the article.

The indication of the volume of the article is then applied either directly or in combination with the weight information of the article to provide data which may be used such as, for example, in obtaining transportation or shipping charges, loading criteria, billing information, etc.

For purposes of simplicity in discussion, the term article will be used throughout and the term will be understood to refer to materials, parcels, packages, boxes, cargo, etc. and other items having height, width and length dimensions.

Certain prior art volume and weight handling systems have utilized static means for positioning a package at a particular position, and then adjusting means such as pointers to provide a measure of the height, width and length of the article. Other known prior art systems disclose means for adjusting the path of an article moving along a conveyor and then utilizing mechanical devices for measuring the height, width and length of the article.

Other prior art shows a scheme wherein parallel light beams are utilized to measure the height, width and length of a moving rectangular article. The article must be rectangular in cross section and must be directed to proceed down a particular path and the number of light beams which the article intersects as it passes a given station provides a measure of the height and width of the article and the length is obtained by measuring the time the article takes to traverse a given point.

Still other prior art is known in which the volumes of solid articles of a generally same shape are obtained by rotating the article between a source of light and a photocell and providing a signal representative of the shadow area made by the article which signal is coupled to, and integrated by, a capacitor.

Accordingly, it is an object of this invention to provide a means for measuring the volume of a moving article, which article may be of any cross section and which article may pass a given station in any position.

It is another object of the present invention to provide a system capable of obtaining the volume of articles which may be of different geometrical shapes, which articles need not be handled or aligned in any special way to obtain their volume.

It is another object of the present invention to provide a means for obtaining, from and for each article, volume data and processing this data to compare it with predetermined references or standards to provide information which can be subsequently used for obtaining loading data, transportation rates, total transportation charges, etc.

It is yet another object of the present invention to provide an improved control system for processing articles of different materials, volumes and weights to provide raw data which may be utilized for control purposes, such as, for example, loading information, transportation rate information, etc.

It is another object of the present invention to provide an improved process control system for the loading of cargo into carriers.

It is another object of the present invention to provide an improved control system for obtaining length, width and height information while an article is moving on a conveyor.

It is a still further object of the present invention to provide an improved process control system for measuring an article moving on a conveyor for obtaining volume data, which data is fed into a processing circuitry for determining the actual and also cubed volume of the article, i.e., the volume computed by multiplying the maximum dimensions of the article.

The system of the invention may further be used for different control purposes such as for determining selected lengths to which a continuous strip or length material should be cut for specific application. For example, the sale price of a length of material may depend on the volume and weight of the material; hence, the process control system of the invention can be utilized to provide volume data to indicate the line at which the material should be cut. The weight data may then be obtained. Thus, it is yet another object of the present invention to provide a means of providing selected measurements of continuous materials.

Another feature of the process control system of the invention is to provide a means enabling the optimum utilization of a given cargo space. For example, it is desirable that a cargo hatch of a transport plane be loaded to an optimum capacity to obtain full utilization of the space in both volume and weight parameters. The present practice is to randomly load articles onto so-called loading pallets until the dimensional outline of the load indicated by a template is reached. The loaded pallet is then moved as an entity into the cargo hatch. Such loading is of course haphazard with respect to obtaining optimum loading of the cargo space. The present invention will optimize the loading of such pallets by providing data which can be utilized to program or arrange the articles to be loaded in an optimum arrangement on each pallet and by optimizing the number of pallets and their position in the cargo space to provide most efficient loading and unloading of the space.

Accordingly, it is yet another object of the present invention to provide a system for obtaining optimum loading of a given space.

The foregoing and other objects, features and advantages of the invention will be apparent from the following more particular description of preferred embodiments of the invention, as illustrated in the accompanying drawings.

In the drawings in which like reference characters refer to like elements throughout:

FIGS. 1 and 1A show a system according to the invention in block diagram form.

FIG. 2 shows a modification of the system of FIGS. 1 and 1A.

The system 10 of the invention and its operation will first be described with reference to FIGS. 1 and 1A to clearly set forth various features of the invention.

In FIG. 1 an input device 11, which is usually a part of system 10, is utilized to convert the incoming information into suitable data for processing by the system and to enter the data into the system 10 as is well known in the art. The input device 11 may be a manual input such as a typewriter, as utilized in one embodiment, or it may also be a magnetic or punched tape input, a card input, an input from optical scanning means or any other such suitable input means for converting the input information into suitable data for use in the system 10 of the invention.

As shown in FIG. 1, in one embodiment, the input information includes for example, the waybill number, the destination, the class and the item. For articles having extraordinary weight, dimensions, or volume characteristics, data on such articles, indicated by the arrowed line (OP) DIM, may be optionally entered by the input device 11 into the system 10. Such optional dimension data bypasses the weight and volume measuring unit.

The input device 11 may be arranged such that the date is automatically included and entered with each group of information, and the date need be varied only daily. For various operations, additional data relating, for example, to foreign or special shipments may be entered into the system 10 by the input device 11.

The general data from the input device 11 is coupled through an electrical lead 12 to a computer 30, or in some cases directly to an output device 39, where the data is processed. Also, the input device 11 couples the signals providing optional dimension data of the height, width and length of a particular article, through lead 16 and an OR circuit 17, leads 21, 22 and 23, and leads 24, 25 and 26, to the multiplying circuit 18. As will be explained hereinbelow, leads 24, 25 and 26 also correspond to, or conduct, the horizontal, vertical and time signals indicative of the width, height and length of an article from the memory 48 to the multiplying circuit 18.

The articles A, B, C etc., which may be of any geometrical shape and which are to be handled and processed as for loading into an airplane cargo space, are placed or loaded on a moving medium 40. The moving medium 40 may be a conveyor, monorail or similar device and may comprise various individual parts arranged to convey the articles through a light grid frame 31, onto and off of a weighing platform 41, and thence to a dispatching unit or to a pallet staging area.

It has been found desirable when maximum dimensions are necessary to tend to "square up" the article prior to conveying it past the light grid frame 31. This may be done in a variety of ways, known in the art, such as by providing a bend in the conveyor, or by slanting the conveyor transversely and including a wall or reference side against which the article can bear. Although the "squaring" structure is not essential, it enables the volume measuring and weighing to be done more expeditiously. Also, the moving medium or conveyor 40 may include a delay means (not shown) to maintain the spacing between articles to a preselected minimum distance so that articles are positioned one after the other and do not overlap; such devices are well known in the conveyor art.

For most operations a weighing platform 41 associated with weighing circuitry 42 provides an indication of the weight of an article while the article is in motion and has been found to be most efficient. A suitable weighing system which may be employed is disclosed in the copending application of Roberto Ortiz-Muniz and J. Gregory Green, Ser. No. 220,088 for Voltage Measuring and Conversion System filed on Aug. 28, 1962; U.S. Patent 3,258,764 issued June 28, 1966, and assigned to the same assignee as the present application.

In one particular utilization of the invention, a conveyor system carries the articles in quite rapid succession onto a weighing platform 41 where the articles are weighed, and then the article is moved off the weighing platform by the conveyor 40. The weighing operation must be accomplished quickly and accurately.

The above noted application of Muniz et al. utilizes an analog to digital conversion system to provide a weight measurement of the article. The circuits of that application employ a load cell and associated components for converting a load or weight function into a representative analog voltage signal. This signal is connected and processed in electronic circuitry to provide a digital signal indicative of the load being weighed. More specifically, the Muniz application provides a novel ramp voltage comparator operating upon an offset zero principle wherein the measuring function need not be initiated at the instant the ramp voltage is begun but may be positioned to occur at any portion of the ramp voltage curve. This provides an accurate, true and immediate representation of the weight affecting the load cell. A completely detailed explanation of the operation of the weighing circuitry is included in the aforementioned application.

Thus, the weight information from weighing platform 41 is converted into an electrical signal by the weighing circuitry 42 to thereby couple an electrical signal indication of the weight of each article through lead 43 to an electrical comparator 44. The comparator 44 compares the electrical signal on lead 43 with a weight equivalent signal coupled to the comparator 44 from the volume indicating portion of the system, as will be fully explained hereinbelow. The output of the comparator 44 provides information useful in determining whether the transportation charges will be based on weight or on volume, as will also be explained.

It is also to be understood that static weighing means could also be employed in conjunction with system 10. Static weighing has been found to be particularly useful for articles of extraordinary size, for example, sizes larger than normally handled. These latter mentioned articles are of the type for which optional dimension information can be coupled directly from the input device through lead 12 to the compter 30.

The conveyor 40 carries each article past a light grid frame 31, which is positioned to straddle the conveyor; in this embodiment, frame 31 is positioned adjacent the weighing platform 41. The light grid 31 in conjunction with its associated electronic switching circuit 32 and the light grid and timing unit circuitry 33 provides an indication of the height, width and length of each article passing therethrough. The light grid and timing unit circuitry 33 may be similar to that disclosed in the copending application of R. M. Henderson et al. Ser. No. 571,112 filed on Aug. 8, 1966 entitled Measuring System and assigned to the same assignee as the present application.

The structure of the light grid 31 comprises an essentially square frame 34, having in one embodiment, ninety-nine lamps or other source of directional light indicated generally by numeral 35. The lamps are mounted in a row on the upper horizontal cross-piece of frame 34 and positioned to be equally spaced about one-fourth inch from each other. Each lamp 35 is arranged to direct its beam of light to a respective or corresponding light responsive device such as a photocell and indicated generally by numeral 36 mounted on the lower horizontal cross-piece of frame 34. The photocells 36 are of a conventional type which produces an indication in the form of an electric signal when light strikes or energizes the sensitive surface of the cell. The photocells 36 are likewise equally spaced and positioned about one-fourth inch from each other. Each of the light beams from the respective lamps 35 is arranged to be parallel with one another and thus only effect switching of a respective photocell 36.

As is known in the art, the light sources 35 could comprise a single source of light and a plurality of lenses; also, the light responsive devices 36 might be a single device providing an analog response to the amount of light impinging thereon.

When the conveyor moves an article between the lamps 35 and the photocells 36, selected ones of the light beams will be interrupted dependent on the dimensions of the article. The electronic switches, indicated generally by the block 32 and which are of any suitable known type, are connected to respective photocells 36 and will be activated in accordance with the change in the energization of the respective photocell 36. Each of the switches 32 is arranged to be, say, closed, when light from a particular lamp 35 is impinging on the respective photocell 36. When the light from a particular lamp 35 is interrupted the respective photocell 36 provides a signal to cause the associated switch 32 to become electrically open. This type of switching operation is, of course, well known and there are any number of suitable switching circuits that could be utilized as switches 32.

It can readily be appreciated that the number of the vertical light beams interrupted by an article passing through the light grid 31 gives an indication of the horizontal or width measurement of the article.

Likewise, a similar number of lamps 37 are positioned on the left vertical cross-piece of frame 34, and a like number of photocells 38 are positioned on the right vertical cross-piece of frame 34. The lamps 37 and photocells 38 with the associated switching circuits 32 provide an indication of the height dimension of the passing article; i.e., the number of horizontal beams interrupted provides such height dimension indication.

Obviously the position of the lamps and the respective photocells can be interchanged on frame 34 without affecting the operation of the system.

The conveyor 40 includes a timing means which is associated with the motion of the conveyor to activate the two groups of lamps and photocells. The timing means provides a means of obtaining the length dimension of the article; that is, the dimension parallel to the direction of travel of the conveyor 40. The timing unit initiates the height and width measurements when the leading portion of an article activates a timing switch. The measurement is terminated when the article moves past the light grid 31. When the article moves past the light grid 31 a control signal to the weighing circuit 42 is coupled from the light grid and timing unit circuitry 33 through lead 27 to initiate the weighing operation. The aforementioned control signal is effectively delayed a fraction of a second to assure that the article is on platform 41 in position to be weighed. Note that the relative positions of the light grid 31 and weighing platform 41 could be readily interchanged.

The three electrical signal outputs from the light grid and timing unit circuitry 33, indicative of the height, width and length of an article, are coupled through leads 24, 25 and 26 to a multiplying circuit 18 where these three electrical signals are effectively multiplied, as will be explained, to give the volume of the article.

The light grid and timing unit 33 also provides an output indicative of the maximum height, width and length measurements of an article, to respective counters 45, 46 and 47, which respectively indicate and store the maximum height, width and length measurements recorded for any element of a given article. The counters 45, 46 and 47 may be of any suitable type known in the art. When the light grid 31 detects that a particular article has passed the light grid, the light grid and timing unit circuitry 33 couples a signal to trigger the counters 45, 46 and 47 concurrently to couple their stored output to a memory 48 which may be of any suitable type, such as of ferrite cores.

Since memory 48 performs a relatively simple task and need not be very sophisticated, it has been found to be more economical to provide a separate memory for this purpose rather than to provide equivalent storage in the computer 30. However, the memory in computer 30 could likewise perform the function of memory 48.

The output from the memory 48 is coupled through leads 49, 50 and 51 to the multiplying circuit 18.

The output from the memory 48 is coupled through leads 49, 50 and 51 to the multiplying circuit 18.

The multiplying circuit 18 may be similar to that disclosed in copending application of R. M. Henderson and R. Zechlin, Ser. No. 570,909, entitled Arithmetic Circuit Including Electronic Multiplying and Dividing Circuitry and assigned to the same assignee as the present application. Alternatively, the multiplying circuit 18 can be of any suitable known type which effects a multiplication of three numbers by multiplying two of the numbers and then multiplying the result by the third number. Thus, the multiplying circuit 18 receives the three inputs indicative of the height, width and length measurements on loads 24, 25 and 26 and provides an output indicative of the actual or summed volume of an article.

The multiplying circuit also multiples the aforementioned maximum dimensions received from the memory 48 on leads 49, 50 and 51. These three maximum dimensions are multiplied to obtain the so-called cubed volume information. A relationship between the actual or summed volume and the volume obtained by multiplying the maximum dimensions gives a workable indication of the deviation from what is considered to be a rectangular solid optimum. In this way, a figure of merit or a criterion indicative of the difficulty in filling unusable space is provided.

While for most commercial applications, both the actual and cubed volume are utilized, in certain instances, only one or the other of the actual or cubed volume may be utilized.

The actual volume output from multiplying circuit 18 is coupled through lead 52 and an OR circuit 54 to a second multiplying circuit 58, and the cubed volume output from multiplying circuit 18 is coupled through lead 53 and OR circuit to the multiplying circuit 58. The multiplying circuit 58 multiples the outputs from the multiplying circuit 18 by a preselected stored reference rate constant which is determined to provide a transportation charge.

In one embodiment, the multiplying circuit 18, the OR circuit 54, and the multiplying circuit 58 compromise a single unit; however, for explanatory purposes, in FIG. 1A it is divided into the three components shown.

The output of the multiplying circuit 18 is also connected through leads 60 and 61 and an OR circuit 62 to an accumulator 65. A second input to accumulator 65 is obtained through lead 64 from the weighing circuitry 42. Accumulator 65 may also be of a type wherein the accumulator is set to a given value and as the number of articles processed increases, the number on the accumulator is reduced, until a zero point or reference is reached. At this zero point the accumulator provides an output to conveyor control 66, to, for example, stop the conveyor or for any other purpose such as changing the channel leading in to the conveyor, as for example, to start loading or handling another group of articles in another cargo space.

Briefly shifting to FIG. 2, the accumulator 65 may also be connected to accumulate and provide the total volume, both actual and cubed, of the various articles in a given group. The total actual or cubed volume data from accumulator 65 is coupled through an OR circuit 73 and leads 70 and 71 to the multiplying circuit 58. The accumulator 65 is also connected to accumulate the total weight of the various articles in a given group. The weight data from accumulator 65 is coupled through lead 72 to the comparator 44 where the total volume and total weight data are compared to provide total equivalent weight. The circuitry of FIG. 2 permits even closer control of the loading of a given space.

Present shipment or packaging charges are determined either on a weight or volume basis. Accordingly, one of the determinations made by the system of the invention is whether the transportation charges are to be on a weight or on a volume basis. This latter determination is made on the basis of a selected reference standard or so-called equivalent weight obtained by multiplying the volume by a given constant. To determine the basis of the shipment charges, the output signal of the multiplying circuit 58 is coupled through lead 59 to the comparator 44 which compares the actual weight and equivalent weight signals. The comparator 44 may be of any suitable known type which receives and compares the signals and provides an output indicative of the larger signal. If the actual weight is equal to or greater than the equivalent weight, the transportation charges are on a weight basis. If the actual weight is less than the equivalent weight, the transportation charges are on a volume basis. The comparator provides an output indicative of the higher amplitude signal through lead 69 to the associated computer 30.

The data received from the comparator 44 is combined in the computer 30 with commodity code data and the factor relating to the distance through which the article will be transported. The distance factor is stored in the computer 30 memory and is addressable by the destination address entered into the system 10 by input device 11. The computer 30 combines and processes all the received data and selectively activates the output devices 39, which may be printers, card punches, or other record retaining means of any suitable known types to print, record or display the transportation charges.

It should be understood also that the system shown in FIGS. 1 and 1A can be a part of a larger network of such systems which are connected together by communication facilities to provide an integrated cargo handling system for, say, a complete airline company.

While the invention has been particularly shown and described with references to preferred embodiments thereof, it will be understood by those skilled in the art that the foregoing and other changes in form and details may be made therein without departing from the spirit and scope of the invention. For example, the system of our invention may be utilized to test the density of an article; more specifically, our system may be utilized to determine the volume and weight of a metal ingot and to compare the results against a standard to obtain an indication of the quality of the ingot.

We claim:
1. A system for obtaining and combining signals representative of the weight and volume of an article comprising, in combination:
  (a) input means for coupling descriptive data for a given article to associated data processing means;
  (b) a moving medium for moving an article along a defined path;
  (c) means for automatically indicating the dimensions of said article in a direction transverse to said path as said article is moving;
  (d) means for automatically indicating the dimension of said article in a direction substantially parallel to said path as said article is moving;
  (e) means for multiplying said article dimensions to provide a first control signal representative of the volume of said article;
  (f) means for combining said first control signal with a reference factor to obtain a weight reference signal;
  (g) means for obtaining a signal representative of the actual weight of an article;
  (h) comparator means for comparing said actual weight signal and said weight reference signal and providing an output indicative of the relative magnitude thereof;
  (i) means for coupling said comparator output to the data processing means whereby said comparator output may be processed with said article descriptive data;
  (j) means for storing the maximum linear dimensions of an article;
  (k) means for multiplying said maximum dimensions;
  (l) whereby the maximum or cubed volume of an article is obtained to obtain loading criteria.

2. A system for obtaining and combining signals representative of the weight and volume of an article characterized by:
  (a) input means for coupling descriptive data for a given article to associated data processing means;
  (b) a moving medium for moving an article along a defined path;
  (c) means for automatically indicating the dimensions of said article in a direction transverse to said path as said article is moving;
  (d) means for automatically indicating the dimension of said article in a direction substantially parallel to said path as said article is moving;
  (e) means for multiplying said article dimensions to provide a first control signal representative of the volume of said article;
  (f) means for combining said first control signal with a reference factor to obtain a weight reference signal;
  (g) means for obtaining a signal representative of the actual weight of an article;
  (h) comparator means for comparing said actual weight signal and said weight reference signal and providing an output indicative of the relative magnitude thereof;
  (i) means for coupling said comparator output to the data processing means whereby said comparator output may be processed with said article descriptive data;
  (j) means for accumulating the total weight of a number of articles; and
  (k) means for accumulating the total volume of said number of articles.

3. A system for obtaining and combining signals representative of the weight and volume of an article characterized by:
  (a) input means for coupling descriptive data for a given article to associated data processing means;
  (b) a moving medium for moving an article along a defined path;
  (c) means for automatically indicating the dimensions of said article in a direction transverse to said path as said article is moving;
  (d) means for automatically indicating the dimension of said article in a direction substantially parallel to said path as said article is moving;
  (e) means for multiplying said article dimensions to provide a first control signal representative of the volume of said article;
  (f) means for combining said first control signal with a reference factor to obtain a weight reference signal;
  (g) means for obtaining a signal representative of the actual weight of an article;
  (h) comparator means for comparing said actual weight signal and said weight reference signal and providing an output indicative of the relative magnitude thereof;
  (i) means for coupling said comparator output to the data processing means whereby said comparator output may be processed with said article descriptive data;

(j) an accumulator arranged to receive the weight and volume signals; and (k) moving medium control means connected to said accumulator;

(l) whereby said moving medium is controlled in accordance with the weight and volume obtained from said weight and volume means.

References Cited

UNITED STATES PATENTS

| | | | |
|---|---|---|---|
| 2,630,043 | 3/1953 | Kolish | 73—432 |
| 2,708,368 | 5/1955 | Kolish | 73—432 |
| 3,154,673 | 10/1964 | Edwards | 235—151.3 |
| 3,318,402 | 5/1967 | Kendrick | 177—50 |
| 3,264,878 | 8/1966 | Balog | 73—432 |
| 3,295,213 | 1/1967 | Hillyar-Russ et al. | 73—227 |

RICHARD C. QUEISSER, *Primary Examiner.*

C. I. McCLELLAND, *Assistant Examiner.*

U.S. Cl. X.R.

177—220; 214—52; 235—156